United States Patent
Xie et al.

(10) Patent No.: US 12,375,175 B2
(45) Date of Patent: Jul. 29, 2025

(54) LIGHTWEIGHT SCALABLE MULTI-USER OPTICAL ANTENNA AND COMMUNICATION METHOD

(71) Applicant: XI'AN INSTITUTE OF OPTICS AND PRECISION MECHANICS, CHINESE ACADEMY OF SCIENCES, Shaanxi (CN)

(72) Inventors: Xiaoping Xie, Shaanxi (CN); Xinning Huang, Shaanxi (CN); Wei Wang, Shaanxi (CN); Yiyi Zhao, Shaanxi (CN)

(73) Assignee: XI'AN INSTITUTE OF OPTICS AND PRECISION MECHANICS, CHINESE ACADEMY OF SCIENCES, Shaanxi (CN)

( * ) Notice: Subject to any disclaimer, the term of this patent is extended or adjusted under 35 U.S.C. 154(b) by 124 days.

(21) Appl. No.: 18/044,227

(22) PCT Filed: Mar. 11, 2021

(86) PCT No.: PCT/CN2021/080094
§ 371 (c)(1),
(2) Date: Mar. 7, 2023

(87) PCT Pub. No.: WO2022/052432
PCT Pub. Date: Mar. 17, 2022

(65) Prior Publication Data
US 2024/0022326 A1    Jan. 18, 2024

(30) Foreign Application Priority Data
Sep. 11, 2020 (CN) .......................... 202010953343.5

(51) Int. Cl.
*H04B 10/118* (2013.01)
*G02B 26/08* (2006.01)
(Continued)

(52) U.S. Cl.
CPC ....... *H04B 10/118* (2013.01); *G02B 26/0816* (2013.01); *G02B 27/09* (2013.01); *G02B 27/141* (2013.01); *H04B 10/503* (2013.01)

(58) Field of Classification Search
CPC .. H04B 10/118; H04B 10/503; H04B 10/112; H04B 10/11; G02B 26/0816; G02B 27/09; G02B 27/141; G02B 27/00
(Continued)

(56) References Cited

U.S. PATENT DOCUMENTS

| 6,347,001 B1 | 2/2002 | Arnold et al. |
| 9,407,363 B2 * | 8/2016 | Aoki .................... H04B 10/118 |

(Continued)

FOREIGN PATENT DOCUMENTS

| CN | 103326780 A | 9/2013 |
| CN | 104092494 A | 10/2014 |

(Continued)

*Primary Examiner* — Jai M Lee
(74) *Attorney, Agent, or Firm* — NKL Law; Allen Xue

(57) ABSTRACT

A lightweight scalable multi-user optical antenna includes a coarse tracking liquid crystal, an optical filter, a beam shrinking system, a fine tracking liquid crystal and a beam splitter which are arranged in sequence and are located on a same central axis; further includes a data analysis and instruction system, a coarse tracking liquid crystal controller, a fine tracking liquid crystal controller, j single-mode optical fibers, and an imaging system and a dichroic coupling system which are respectively arranged in two emergent light paths of the beam splitter; and can be used to receive and transmit the laser beams of j communication targets. When the number of users increases, only sub regions of the coarse tracking liquid crystal and the fine tracking liquid crystal need to be added, and no additional components need to be added, and the lightweight scalable multi-user optical antenna has strong scalability.

12 Claims, 2 Drawing Sheets

(51) Int. Cl.
*G02B 27/09* (2006.01)
*G02B 27/14* (2006.01)
*H04B 10/50* (2013.01)

(58) Field of Classification Search
USPC .......................................................... 398/118
See application file for complete search history.

(56) References Cited

U.S. PATENT DOCUMENTS

| | | | |
|---|---|---|---|
| 10,299,940 B2 * | 5/2019 | Kloke .................... | A61F 2/5046 |
| 10,627,576 B2 * | 4/2020 | Kim .................... | H04B 10/1125 |
| 10,707,961 B2 * | 7/2020 | Turner .................... | H04B 7/195 |
| 11,664,905 B2 * | 5/2023 | Uyeno .................... | H04B 1/16 |
| | | | 359/279 |
| 11,736,188 B2 * | 8/2023 | Nykolak .............. | H04B 10/118 |
| | | | 398/118 |
| 11,777,600 B2 * | 10/2023 | Berceau ............... | H04B 10/118 |
| | | | 398/118 |
| 2007/0127926 A1 * | 6/2007 | Marioni ............. | H04B 10/1121 |
| | | | 398/118 |
| 2013/0126713 A1 * | 5/2013 | Haas .................... | H04B 10/691 |
| | | | 250/208.2 |
| 2014/0226145 A1 * | 8/2014 | Steffey .................... | G01S 17/89 |
| | | | 356/4.01 |
| 2022/0014274 A1 * | 1/2022 | Twichell .............. | G02B 27/141 |

FOREIGN PATENT DOCUMENTS

| | | | | | |
|---|---|---|---|---|---|
| CN | 104834148 | A | | 8/2015 | |
| CN | 106461932 | A | * | 2/2017 | ......... H04B 10/1125 |
| CN | 110299940 | A | * | 10/2019 | ........... H04B 10/503 |
| CN | 111316500 | A | * | 6/2020 | ............... H01Q 1/38 |
| CN | 112162403 | A | | 1/2021 | |
| DE | 102016107312 | A1 | * | 11/2016 | ............ G01B 11/00 |
| WO | 2008048219 | A2 | | 4/2008 | |

* cited by examiner

LIGHTWEIGHT SCALABLE MULTI-USER OPTICAL ANTENNA AND COMMUNICATION METHOD

FIELD

The present disclosure belongs to the field of space laser communication, and in particular, relates to a lightweight scalable optical antenna capable of simultaneously supporting multiple high-speed data communication links from different space laser communication terminals, and a specific communication method based on the multi-user optical antenna.

BACKGROUND

Satellite-based laser communication is an irreplaceable means to build a space information network with high-speed data transmission ability. At present, many space laser communication projects at home and abroad have successfully achieved in-orbit demonstration and verification under the long-distance application scenarios such as satellite-to-satellite and satellite-to-earth. The increasing number of various spacecrafts and space platforms requires a space information backbone network based on high-speed laser links, so as to accomplish the fast real-time transmission of various space exploration data.

In the space laser-based backbone network, when different laser terminals need data transmission to the central node at the same time, multiple optical antennas are required to simultaneously receive the laser links from different targets. Optical antennas on existing laser communication terminals usually adopt the mechanical turntable structures. The target acquisition, tracking and pointing are realized by mechanical rotation and tip-tilt mirror swing to establish the corresponding space laser links. Such optical antenna can only respond to a single user's link-establishing requirement at a certain period of time, so multiple users response need to equip the corresponding numbers of mechanical turnable optical antennas for the simultaneous communication. Correspondingly, the size, weight and power (SWaP) consumption at the central node will sharply increase since a single mechanical-type optical antenna can consume more than 70% SWaP of the space laser terminal. However, the space platform' SWaP resources are limited, so it is difficult to meet the practical requirements of assembling multiple mechanical rotary-table-type optical antennas for multi-user simultaneous communication. In order to reduce the SWaP resource requirements of the optical antennas, there is also a solution to realize multi-user communication based on the liquid crystal optical phased array, which simply stacks multiple sets of optical phased array antennas to cope with multiple communication targets. For example, the Chinese patent CN 104834148 A discloses a bidirectional four-beam liquid crystal optical phased array antenna and a multi-user communication method thereof. The above patent only relates to simple stacking, that is to say, if there are several users, the same set of antennas will be copied several times to realize multi-user communication. However, when the number of users communicating at the same time increases, the disadvantages of this replication stacking solution will appear, and it still faces the problems that space resources are limited and it is difficult to expand.

SUMMARY

In order to overcome the problem that the existing optical antenna scheme is difficult to satisfy the requirement of multi-user simultaneous communication, the disclosure provides a lightweight scalable multi-user optical antenna, which can simultaneously support multi-user data communication at a central node in a space laser-based backbone network. Compared to the traditional mechanical rotary-table-type antenna, the novel optical antenna owns several advantages such as multi-user compatibility at the same time, and the low SWaP resource requirement. Compared to the stacked liquid crystal optical phased array antenna scheme, when the user number increases, only coarse and fine tracking liquid crystal sub-regions need to be added, and all other components need no addition, so that it has strong scalability.

The technical solutions of the present disclosure are as follows:

A lightweight scalable multi-user optical antenna for simultaneous communication of j communication targets, the center wavelengths of laser beams of the j communication targets being different from each other; j being a natural number;

the antenna is characterized in that the antenna includes a coarse tracking liquid crystal, an optical filter, a beam shrinking system, a fine tracking liquid crystal and a beam splitter which are arranged in sequence and are located on a same central axis; the beam splitter is placed at an included angle of 135 degrees with the central axis; the antenna further includes a data analysis and instruction system, a coarse tracking liquid crystal controller, a fine tracking liquid crystal controller, j single-mode optical fibers, and an imaging system and a dichroic coupling system which are respectively arranged in two emergent light paths of the beam splitter;

the coarse tracking liquid crystal and the fine tracking liquid crystal are each spliced by j sub-liquid crystals with consistent performance;

the coarse tracking liquid crystal controller and the fine tracking liquid crystal controller each include j voltage output ends; each voltage output end of the coarse tracking liquid crystal controller is connected with a sub-liquid crystal of the coarse tracking liquid crystal; each voltage output end of the fine tracking liquid crystal controller is connected with a sub-liquid crystal of the fine tracking liquid crystal;

the optical filter has a surface divided into j regions, each region is coated with an antireflective film such that an i-th region allows transmission of only a laser beam of an i-th communication target having a center wavelength of $\lambda_i$; wherein i is a natural number less than or equal to j;

the imaging system includes a first coupling system and a detector arranged in sequence along the light path, a light-sensitive surface of the detector being divided into j regions;

the laser beams of the j communication targets are in one-to-one correspondence with the j sub-liquid crystals of the coarse tracking liquid crystal, the j regions of the optical filter, the j sub-liquid crystals of the fine tracking liquid crystal, the j regions of the detector, and the j single-mode optical fibers;

an input end of the data analysis and instruction system is connected with the detector, and an output end is respectively connected with the coarse tracking liquid crystal controller and the fine tracking liquid crystal controller; the data analysis and instruction system is configured to receive the initial position information of each communication target or extract the light spot information on each region of the light-sensitive surface of the detector, and perform analysis separately, and provide the coarse tracking liquid crystal controller and the fine tracking liquid crystal controller with an angular deflection information instruction;

the coarse tracking liquid crystal controller is configured to convert the angle deflection information instruction into a control voltage of a corresponding sub-liquid crystal of the coarse tracking liquid crystal;

the corresponding sub-liquid crystal of the coarse tracking liquid crystal deflects under the control voltage;

the optical filter is configured to transmit the light beam of the corresponding center wavelength;

the beam shrinking system is configured to compress or amplify the diameter of the incident light beam;

the fine tracking liquid crystal controller is configured to convert the angular deflection information instruction into a corresponding sub-liquid crystal control voltage of the fine tracking liquid crystal;

the corresponding sub-liquid crystal of the fine tracking liquid crystal deflects under the control voltage;

the beam splitter is an energy beam splitter configured to transmit half of the beam output by the fine tracking liquid crystal in transmission and the other half in reflection; the transmitted beam is incident on the dichroic coupling system and the reflected beam is incident on the imaging system; or the reflected beam is incident on the dichroic coupling system and the transmitted beam is incident on the imaging system; the beam splitter is also configured to transmit the output beam of the dichroic coupling system;

the first coupling system in the imaging system is configured to converge and couple the light beams to corresponding regions of the light-sensitive surface of the detector; the detector enables beam imaging and outputs spot information on each corresponding region; and the dichroic coupling system is configured to couple the laser beam of the corresponding communication target into the corresponding single-mode optical fiber and also to convert the beam in the corresponding single-mode optical fiber into parallel light incident on the beam splitter.

Furthermore, the dichroic coupling system includes j–1 dichroic mirrors and j coupling systems, the j–1 dichroic mirrors are capable of selectively transmitting or reflecting laser beams of a set center wavelength and discriminating the laser beams of the j communication targets by different center wavelengths; the j coupling systems couple the laser beams of different center wavelengths into the corresponding single-mode optical fibers after beam compression, convert output beams of the single-mode optical fibers into parallel beams and input the parallel beams to the corresponding dichroic mirrors.

Furthermore, for the common use of reception and transmission, the beam shrinking system consists of a Maksutov telescopic objective and a refractive eyepiece, and a lens and a reflector in the Maksutov telescopic objective are both spherical mirrors.

Furthermore, in order to meet the requirement of a large light passing area of the optical antenna, the fine tracking liquid crystal forms a rectangular liquid crystal device after stacking of three layers of dual-state dual-frequency liquid crystal devices;

each layer of the dual-state dual-frequency liquid crystal device in the fine tracking liquid crystal includes a first liquid crystal region and a second liquid crystal region from left to right in sequence; control voltages of the first liquid crystal region and the second liquid crystal region are different;

the ratio of the first liquid crystal region to the second liquid crystal region in the first layer of the dual-state dual-frequency liquid crystal device is 3:1;

the ratio of the first liquid crystal region to the second liquid crystal region in the second layer of the dual-state dual-frequency liquid crystal device is 2:2; and the ratio of the first liquid crystal region to the second liquid crystal region in the third layer of the dual-state dual-frequency liquid crystal device is 1:3.

Furthermore, the beam shrinking proportion of the beam shrinking system is N;

the area of the coarse tracking liquid crystal is N times the area of the fine tracking liquid crystal, wherein N is a natural number.

Furthermore, each of the j coupling systems includes five optical lenses, the first lens is a system vacuum compensation lens, and the other four lenses are transmissive optical lenses.

Furthermore, the detector is a CMOS infrared image sensor.

Furthermore, $j=4$;

the dichroic coupling system includes a first dichroic mirror, a second dichroic mirror, a third dichroic mirror, a second coupling system, a third coupling system, a fourth coupling system and a fifth coupling system;

the first dichroic mirror, the third dichroic mirror, the fifth coupling system and a fourth single-mode optical fiber are arranged in sequence and located on a same horizontal central axis as the beam splitter; the first dichroic mirror is placed at an angle of 135° to the horizontal central axis; the third dichroic mirror is placed at an angle of 45° to the horizontal central axis;

the first dichroic mirror, the second dichroic mirror, the second coupling system and a first single-mode optical fiber are arranged in sequence and on a same vertical central axis;

the second dichroic mirror, the third coupling system and a second single-mode optical fiber are arranged in sequence and on the same horizontal central axis; the second dichroic mirror is placed at an angle of 135° to the horizontal central axis;

the third dichroic mirror, the fourth coupling system and a third single-mode optical fiber are arranged in sequence and on the same vertical central axis;

the first dichroic mirror is configured to reflect laser beams of a first communication target, the first single-mode optical fiber, a second communication target and the second single-mode optical fiber and to transmit laser beams of a third communication target, the third single-mode optical fiber, a fourth communication target and the fourth single-mode optical fiber;

the second dichroic mirror is configured to transmit the laser beams of the first communication target and the first single-mode optical fiber and to reflect the laser beams of the second communication target and the second single-mode optical fiber; and the third dichroic mirror is configured to reflect the laser beams of the third communication target and the third single-mode optical fiber and to transmit the laser beams of the fourth communication target and the fourth single-mode optical fiber.

The disclosure further provides a method for implementing multi-user communication based on the lightweight scalable multi-user optical antenna described above, including the steps of:

when the laser beams of the j communication targets are received:

Step 1a, receiving, by the data analysis and instruction system, initial position information of a first communication target, and providing an angle deflection information instruction for the coarse tracking liquid crystal controller according to a positional relationship between an initial position of the first communication target and an initial position of a first sub-liquid crystal in the coarse tracking liquid crystal;

Step 2a, converting, by the coarse tracking liquid crystal controller, the angle deflection information instruction into a control voltage, inputting the control voltage to the first sub-liquid crystal of the coarse tracking liquid crystal through a first voltage output end, and controlling the deflection of the first sub-liquid crystal of the coarse tracking liquid crystal, thus enabling the first sub-liquid crystal of the coarse tracking liquid crystal to point to the initial position of the first communication target;

Step 3a, enabling the beam of the first communication target to pass through the first sub-liquid crystal of the coarse tracking liquid crystal, the first region of the optical filter, the beam shrinking system, the first sub-liquid crystal of the fine tracking liquid crystal, the beam splitter and the first coupling system in sequence to generate a spot on a first region of the light-sensitive surface of the detector;

Step 4a, extracting, by the data analysis and instruction system, information of the spot output by the detector, performing analysis, and providing the angle deflection information instruction to the coarse tracking liquid crystal controller according to a positional relationship between the spot position and the center of the first region of the light-sensitive surface of the detector; converting, by the coarse tracking liquid crystal controller, the angle deflection information instruction into a control voltage, and controlling the first sub-liquid crystal of the coarse tracking liquid crystal to deflect;

Step 5a, repeating steps 3a to 4a until the spot is located at the center of the first region of the light-sensitive surface of the detector and has the strongest energy, wherein the allowable deviation is less than or equal to a pixels, a pixel is the smallest imaging unit of the detector, and the energy is the strongest; wherein a is a positive number;

Step 6a, reducing, by the beam shrinking system, the diameter of the beam transmitted by the first sub-liquid crystal of the coarse tracking liquid crystal and outputting a parallel beam to the surface of the first sub-liquid crystal of the fine tracking liquid crystal, and enabling the parallel beam to pass through the beam splitter and the first coupling system in sequence to generate a spot on the first region of the light-sensitive surface of the detector;

Step 7a, extracting, by the data analysis and instruction system, spot information output by the first region of the light-sensitive surface of the detector, and providing the angle deflection information instruction for the fine tracking liquid crystal controller;

Step 8a, converting, by the fine tracking liquid crystal controller, the angle deflection information instruction into a control voltage, outputting the control voltage to the first sub-liquid crystal of the fine tracking liquid crystal via the first voltage output end and controlling the deflection of the first sub-liquid crystal of the fine tracking liquid crystal, thus enabling the first sub-liquid crystal of the fine tracking liquid crystal to point to a specific position;

Step 9a, repeating steps 6a, 7a and 8a until the spot on the first region of the light-sensitive surface of the detector is always stabilized at the center of the detector without drift, wherein the allowable deviation is smaller than or equal to b pixels, and a pixel is the smallest imaging unit of the detector, wherein b is a positive number smaller than a;

Step 10a, coupling, by the dichroic coupling system, the laser beams of the first communication target into the first single-mode optical fiber; and Step 11a, repeating the processes of step 1a to step 10a to successively realize the reception of the laser beams of j communication targets;

when the laser beams of the j communication targets are transmitted:

Step 1b, acquiring, by the data analysis and instruction system, initial position information of the first communication target, and providing an angle deflection information instruction for the coarse tracking liquid crystal controller according to a positional relationship between an initial position of the first communication target and an initial position of the coarse tracking liquid crystal;

Step 2b, converting, by the coarse tracking liquid crystal controller, the angle deflection information instruction into a control voltage, outputting the control voltage to the first sub-liquid crystal of the coarse tracking liquid crystal through a first voltage output end, and controlling the deflection of the first sub-liquid crystal of the coarse tracking liquid crystal, thus enabling the first sub-liquid crystal of the coarse tracking liquid crystal to point to the initial position of the first communication target;

Step 3b, enabling a beacon beam of the first communication target to pass through the first sub-liquid crystal of the coarse tracking liquid crystal, the first region of the optical filter, the beam shrinking system, the first sub-liquid crystal of the fine tracking liquid crystal, the beam splitter and the first coupling system in sequence to generate a spot on a first region of the light-sensitive surface of the detector;

Step 4b, extracting, by the data analysis and instruction system, information of the spot output by the detector, performing analysis, and providing the angle deflection information instruction to the coarse tracking liquid crystal controller according to a positional relationship between the spot position and the center of the first region of the light-sensitive surface of the detector; converting, by the coarse tracking liquid crystal controller, the angle deflection information instruction into a control voltage, and controlling the first sub-liquid crystal of the coarse tracking liquid crystal to deflect;

Step 5b, repeating steps 3b to 4b until the spot is located at the center of the first region of the light-sensitive surface of the detector and has the strongest energy, wherein the allowable deviation is less than or equal to a pixels, a pixel is the smallest imaging unit of the detector, and the energy is the strongest; wherein a is a positive number;

Step 6b, reducing, by the beam shrinking system, the diameter of the beam transmitted by the first sub-liquid crystal of the coarse tracking liquid crystal and outputting a parallel beam to the surface of the first sub-liquid crystal of the fine tracking liquid crystal, and enabling the parallel beam to pass through the beam splitter and the first coupling system in sequence to generate a spot on the first region of the light-sensitive surface of the detector;

Step 7b, extracting, by the data analysis and instruction system, spot information output by the first region of the light-sensitive surface of the detector, and providing the angle deflection information instruction for the fine tracking liquid crystal controller;

Step 8b, converting, by the fine tracking liquid crystal controller, the angle deflection information instruction into a control voltage, outputting the control voltage to the first sub-liquid crystal of the fine tracking liquid crystal via the first voltage output end and controlling the deflection of the first sub-liquid crystal of the fine tracking liquid crystal, thus enabling the first sub-liquid crystal of the fine tracking liquid crystal to point to a specific position;

Step 9b, repeating steps 6b, 7b and 8b until the spot on the first region of the light-sensitive surface of the detector is always stabilized at the center of the detector without drift, wherein the allowable deviation is smaller than or equal to b pixels, and a pixel is the smallest imaging unit of the detector, wherein b is a positive number smaller than a;

Step 10b, converting, by the dichroic coupling system, an output beam of the single-mode optical fiber into a space parallel beam, and then transmitting the space parallel beam to the first sub-liquid crystal of the fine tracking liquid crystal through the beam splitter;

Step 11b, enlarging, by the beam shrinking system, the diameter of the beam transmitted by the first sub-liquid crystal of the fine tracking liquid crystal; transmitting the beam by the first region of the optical filter, deflecting the beam to the direction of the first communication target via the first sub-liquid crystal of the coarse tracking liquid crystal, and establishes a spatial laser link with the first communication target; and Step 12b, repeating the processes of step 1b to step 11b to successively realize the transmission of the laser beams of j communication targets.

Furthermore, Step 10a is specifically:
the first dichroic mirror reflects the laser beam of the first communication target to the second dichroic mirror, the laser beam is transmitted through the second dichroic mirror to reach the second coupling system, and is compressed through the second coupling system to be coupled into the first single-mode optical fiber; and Step 10b is specifically:
the output beam of the first single-mode optical fiber is converted into a spatially parallel beam through the second coupling system, the spatially parallel beam is transmitted through the second dichroic mirror to reach the first dichroic mirror, is reflected through the first dichroic mirror to the beam splitter, and is incident to the first sub-liquid crystal of the fine tracking liquid crystal through the beam splitter.

Furthermore, when reception of the laser beam of the second communication target is implemented,
Step 10a is specifically:
the first dichroic mirror reflects the laser beam of the second communication target to the second dichroic mirror, the laser beam is reflected by the second dichroic mirror to reach the third coupling system, and is compressed by the third coupling system to be coupled into the second single-mode optical fiber;

Step 10b is specifically:
the output beam of the second single-mode optical fiber is converted into a spatially parallel beam by the third coupling system, then the spatially parallel beam is reflected by the second dichroic mirror to reach the first dichroic mirror, is reflected by the first dichroic mirror to the beam splitter, and is incident to the second sub-liquid crystal of the fine tracking liquid crystal via the beam splitter;

when reception of the laser beam of the third communication target is implemented,
Step 10a is specifically:
the laser beam of the third communication target is transmitted by the first dichroic mirror to the third dichroic mirror, is reflected by the third dichroic mirror to the fourth coupling system, is compressed by the fourth coupling system to be coupled into the third single-mode optical fiber;

Step 10b is specifically:
the output beam of the third single-mode optical fiber is converted into a spatially parallel beam by the fourth coupling system, the spatially parallel beam is then reflected by the third dichroic mirror to reach the first dichroic mirror, is transmitted to the beam splitter via the first dichroic mirror, and is incident to the third sub-liquid crystal of the fine tracking liquid crystal via the beam splitter; and when reception of the laser beam of the fourth communication target is implemented,
Step 10a is specifically:
the first dichroic mirror transmits the laser beam of the third communication target to the third dichroic mirror, the laser beam is transmitted through the third dichroic mirror to the fifth coupling system, and is compressed through the fifth coupling system to be coupled into the fourth single-mode optical fiber; and Step 10b is specifically:
the output beam of the fourth single-mode optical fiber is converted into a spatially parallel beam through the fifth coupling system, the spatially parallel beam is transmitted through the third dichroic mirror to reach the first dichroic mirror, is transmitted through the first dichroic mirror to the beam splitter, and is incident to the fourth sub-liquid crystal of the fine tracking liquid crystal through the beam splitter.

Furthermore, $b \leq \frac{1}{5}$.

The advantages of the present disclosure are:
(1), the optical antenna of the disclosure can simultaneously meet the requirement of simultaneous communication of multiple user terminals in the space laser backbone network. Compared with the traditional mechanical rotary-table-type antenna, it has the advantage of simultaneous compatibility of multiple users, and has low resource requirements in terms of volume, weight, power consumption, etc.
(2), the optical antenna of the disclosure has strong scalability. When the number of users increases, only coarse tracking liquid crystal and fine tracking liquid crystal sub-regions need to be added without additional components, and the antenna has strong scalability.

Figure 1:
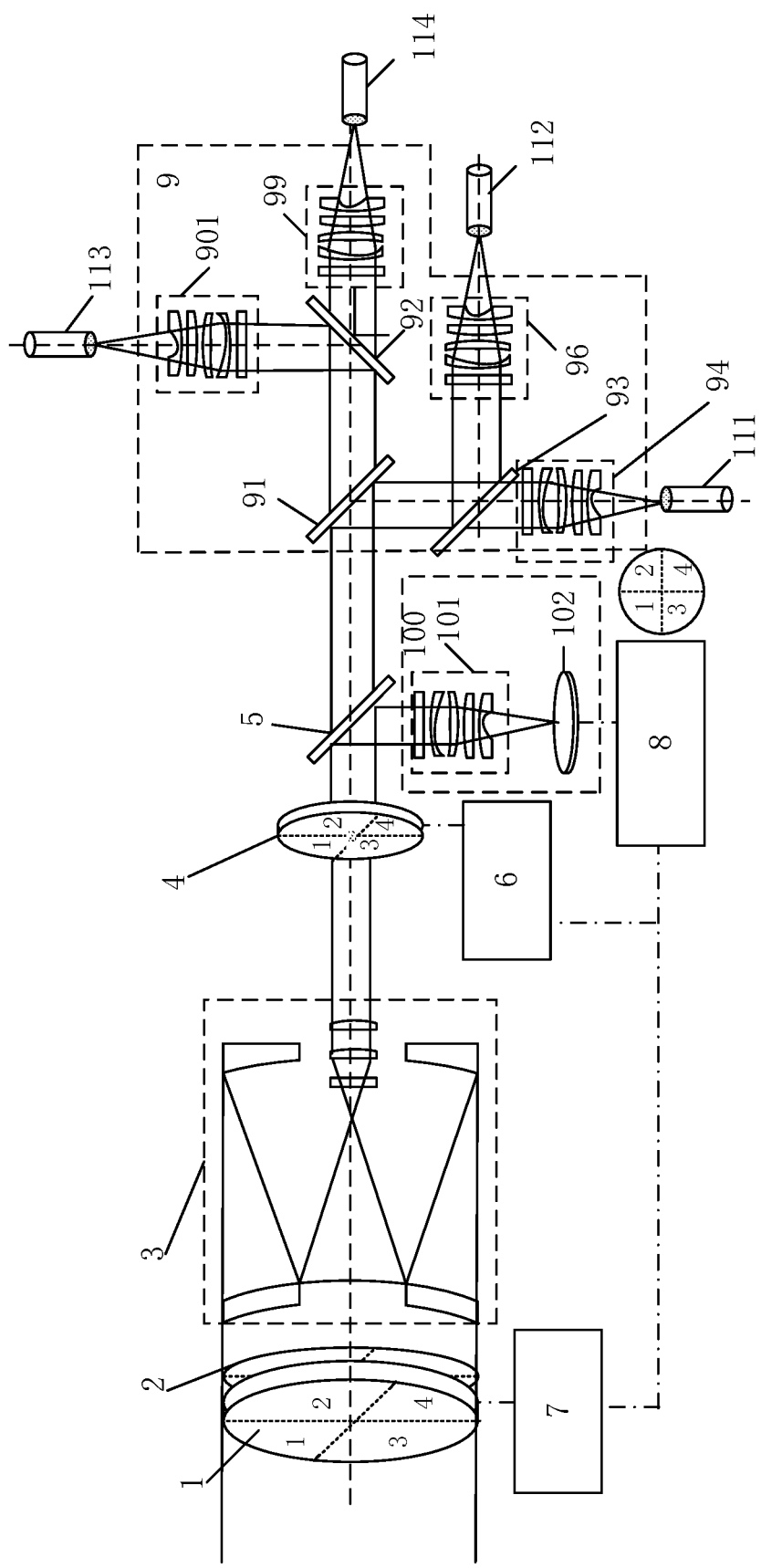
FIG. 1 is a schematic diagram of an optical antenna system of the present disclosure.

reference numerals in the figure are: 1—coarse tracking liquid crystal, 2—optical filter, 3—beam shrinking system, 4—fine tracking liquid crystal, 5—beam splitter, 6—fine tracking liquid crystal controller, 7—coarse tracking liquid crystal controller, 8—data analysis and instruction system, 9—dichroic coupling system, 100—imaging system; 91—first dichroic mirror, 92—third dichroic mirror, 93—second dichroic mirror, 94—second coupling system, 96—third coupling system, 901—fourth coupling system, 99—fifth coupling system; 101—first coupling system, 102—detector; 111—first single-mode fiber, 112—second single-mode optical fiber, 113—third single-mode optical fiber, 114—fourth single-mode optical fiber.

DETAILED DESCRIPTION OF THE EMBODIMENTS

The present disclosure will now be further described with reference to the accompanying drawings and specific embodiments thereof.

The present disclosure provides a lightweight scalable multi-user optical antenna for simultaneous communication of multiple communication targets having different laser beam center wavelengths.

Referring to FIG. 1, this embodiment of the lightweight scalable multi-user optical antenna includes a coarse tracking liquid crystal 1, a coarse tracking liquid crystal controller 7, an optical filter 2, a beam shrinking system 3, a fine tracking liquid crystal 4, a fine tracking liquid crystal controller 6, a beam splitter 5, an imaging system 100, a dichroic coupling system 9, individual single-mode optical fibers, and a data analysis and instruction system 8.

The coarse tracking liquid crystal 1, the optical filter 2, the beam shrinking system 3, the fine tracking liquid crystal 4 and the beam splitter 5 are arranged in sequence from left to right and are located on a same central axis; the beam splitter 5 is placed at an included angle of 135 degrees with the central axis, and the imaging system 100 and the dichroic coupling system 9 are respectively arranged in the reflection light path and the transmission light path of the beam splitter 5. In other embodiments, the imaging system 100 is arranged in the reflection light path of the beam splitter 5 and the dichroic coupling system 9 is arranged in the transmission light path of the beam splitter 5. The imaging system 100 includes a first coupling system 101 and a detector 102 arranged in sequence along the light path, each single-mode optical fiber being coupled to each dichroic coupling system 9. The input end of the data analysis and instruction system 8 is connected with the detector 102, and the output end is connected with the coarse tracking liquid crystal controller 7 and the fine tracking liquid crystal controller 6, respectively; the coarse tracking liquid crystal controller 7 and the fine tracking liquid crystal controller 6 are connected to the coarse tracking liquid crystal 1 and the fine tracking liquid crystal 4, respectively.

Figure 2:
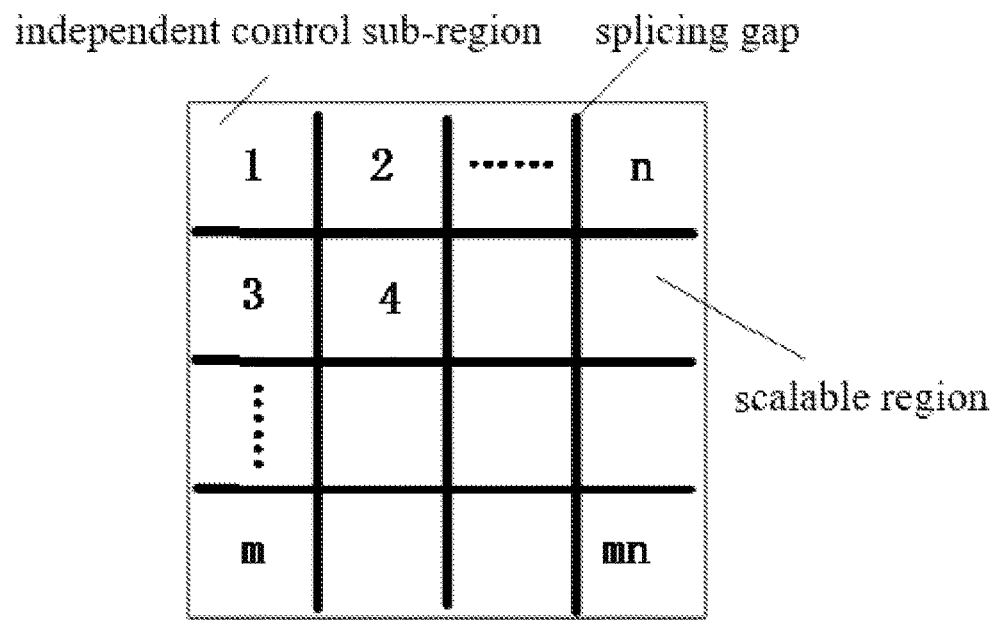
FIG. 2 is a schematic diagram of a sub-region expansion structure of a coarse tracking liquid crystal 1 or a fine tracking liquid crystal 4 according to the present disclosure.

The structure of the coarse tracking liquid crystal 1 and the fine tracking liquid crystal 4 of the present disclosure is shown in FIG. 2, and each is composed of j sub-liquid crystals having uniform properties, in the FIG. 2, mn=j, and j is in the same value as the number of communication objects for simultaneously achieving communication. As shown in FIG. 1, the coarse tracking liquid crystal 1 and the fine tracking liquid crystal 4 of the present embodiment are each made of four sub-liquid crystals spliced, so that simultaneous communication of four communication objects can be achieved at the same time. In the present disclosure, the coarse tracking liquid crystal 1 and the fine tracking liquid crystal 4 operate on the principle that, when an external voltage is applied to the liquid crystal device, a light beam transmitted through the liquid crystal will be angularly deflected from its incident direction. As a result, the transmitted laser beam will be deflected at different angles by different voltage values. By splicing j sub-liquid crystal devices on the same substrate and applying independent voltage control respectively, it is possible to simultaneously control the deflection of a plurality of laser beams by a specified angle. Therefore, the coarse tracking liquid crystal controller 7 and the fine tracking liquid crystal controller 6 of the present disclosure each include j voltage output ends; each voltage output end of the coarse tracking liquid crystal controller 7 is connected with one sub-liquid crystal of the coarse tracking liquid crystal 1; each voltage output end of the fine tracking liquid crystal controller 6 is connected with one sub-liquid crystal of the fine tracking liquid crystal 4; by applying an independent voltage to each sub-liquid crystal, the respective sub-liquid crystals are controlled to realize deflections of different angles.

Figure 3:
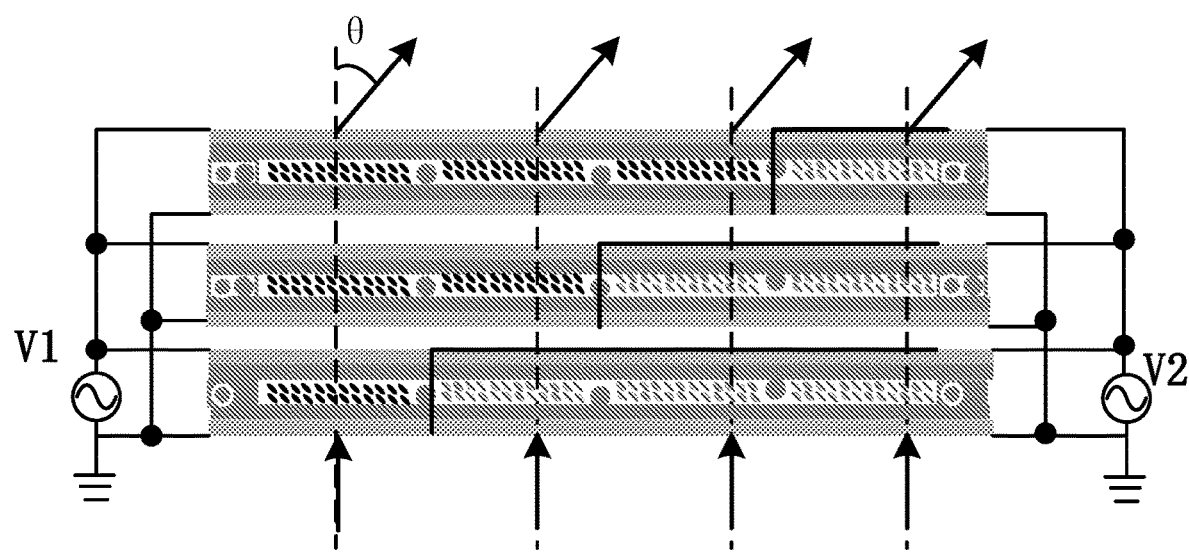
FIG. 3 is a schematic diagram showing the structure of the fine tracking liquid crystal 4 according to the present disclosure.

In order to increase the corresponding rate of the fine tracking the liquid crystal 4, as shown in FIG. 3, the present disclosure adopts a packaging method of staggered stacking of three-layers of dual-state dual-frequency liquid crystal devices, thus forming a rectangular liquid crystal device (In FIG. 1, because the beam shrinking system is circular, the effective light transmission area of the fine tracking liquid crystal 4 is circular in actual use, as shown in FIG. 1), the packaging method ensures the uniform thickness of the fine tracking liquid crystal 4 and the consistent response time at all parts of the surface, thus effectively avoiding the influence of the conventional wedge-shaped packaging method on the tracking accuracy of the optical antenna due to the different response time at different thicknesses.

As can be seen from FIG. 3, each layer of the dual-state dual-frequency liquid crystal device includes two regions, and control voltages of the two regions are different; in addition, the partition ratios of all layers of the dual-state dual-frequency liquid crystal devices are different. As shown in FIG. 3, the first layer of the dual-state dual-frequency liquid crystal device, the second layer of the dual-state dual-frequency liquid crystal device and the third layer of the dual-state dual-frequency liquid crystal device are sequentially arranged from top to bottom.

The partition ratio of the first layer of the dual-state dual-frequency liquid crystal device is 3:1, that is, the ratio of the region with the control voltage being V1 to the region with the control voltage being V2 is 3:1, and the region with the control voltage being V1 and the region with the control voltage being V2 are sequentially arranged from left to right; similarly, the partition ratio of the second layer of the dual-state dual-frequency liquid crystal device is 2:2, and the region with the control voltage being V1 and the region with the control voltage being V2 are also sequentially arranged from left to right; the partition ratio of the third layer of the dual-state dual-frequency liquid crystal device is 1:3, and the region with the control voltage being V1 and the region with the control voltage being V2 are sequentially arranged from left to right; as a whole, the packaged rectangular fine tracking liquid crystal device maybe regarded as being composed of two wedge-shaped dual-frequency liquid crystals with different control voltages. Of course, the region with the control voltage being V2 may also be located in the left half of each layer of the dual-state dual-frequency liquid crystal device; and the region with the control voltage being V1 is located in the right half of each layer of the dual-state dual-frequency liquid crystal device.

As can be seen from FIG. 1, the optical filter 2 of the present disclosure is placed next to the coarse tracking liquid crystal 1 and operates on the principle that: antireflective films are coated in regions, each region allows transmission of a laser beam of a specific wavelength; the present disclosure thus divides the surface of the optical filter 2 into j regions, each of which is coated with a different antireflective film, so that each region can only transmit a laser beam of a particular wavelength, e.g., an i-th region allows transmission of only a laser beam of an i-th communication target having a center wavelength of $\lambda_i$, and i is a natural number less than or equal to j.

The beam shrinking system 3 is configured to reduce or enlarge the diameter of the incident beam by N times, so correspondingly, the area of each sub-liquid crystal of the coarse tracking liquid crystal 1 is N times the area of each sub-liquid crystal of the fine tracking liquid crystal 4.

In this embodiment, the beam shrinking system 3 is composed of a Maksutov telescopic objective lens and a refractive eyepiece, and lenses and reflectors are both spherical. The system can be shared by both receiving and transmitting, and the wave aberration can be controlled in the range of $\leq 0.005\lambda$ ($\lambda$ is the laser wavelength).

The beam splitter 5 adopts the energy beam splitter to transmit half of energy of the incident beam in transmission and transmit the other half of energy in reflection. The output beam of the dichroic coupling system 9 can also be directly transmitted by the beam splitter 5.

A light-sensitive surface of the detector 102 in the imaging system 100 is divided into j regions; the laser beams of the communication targets are in one-to-one correspondence with the j sub-liquid crystals of the coarse tracking liquid crystal 1, the j regions of the optical filter 2, the j sub-liquid crystals of the fine tracking liquid crystal 4, the j regions of the detector 102, and the j single-mode optical fibers.

The dichroic coupling system 9 is configured to couple the laser beam of the corresponding communication target into the corresponding single-mode optical fiber and also to convert the beam in the corresponding single-mode optical fiber into parallel light incident on the beam splitter 5.

In this embodiment j is equal to 4, so the dichroic coupling system 9 includes a first dichroic mirror 91, a second dichroic mirror 93, a second coupling system 94, a third coupling system 96, a third dichroic mirror 92, a fourth coupling system 901 and a fifth coupling system 99. Each coupling system includes five optical lenses, the first lens is a system vacuum compensation lens and the other four are transmissive optical lenses. The lens that the beam first arrives at is defined as the first lens.

The dichroic mirror operates on the principle that, with reference to the central wavelength $\lambda_0$, the light beams having wavelengths less than the central wavelength $\lambda_0$ are reflected and the light beams having wavelengths greater than the central wavelength $\lambda_0$ are transmitted; or, the light beams having wavelengths less than the center wavelength $\lambda_0$ are transmitted and the light beams having wavelengths greater than the center wavelength $\lambda_0$ are reflected.

Thus in this embodiment the first dichroic mirror 91, the third dichroic mirror 92, the fifth coupling system 99, the fourth single-mode optical fiber 114 are located on the same horizontal central axis as the beam splitter 5; the first dichroic mirror 91 is placed at an angle of 135° to the horizontal central axis; the third dichroic mirror 92 is placed at an angle of 45° to the horizontal central axis. The second dichroic mirror 93, the third coupling system 96 and the second single-mode optical fiber 112 are located on the same horizontal central axis; the second dichroic mirror 93 is placed at an angle of 135° to the horizontal central axis. The first dichroic mirror 91, the second dichroic mirror 93, the second coupling system 94, the first single-mode optical fiber 111 are located on the same vertical central axis; the third dichroic mirror 92, the fourth coupling system 901 and the third single-mode optical fiber 113 are located on the same vertical central axis.

The first dichroic mirror 91 is configured to reflect the laser beams of the first communication target, the first single-mode optical fiber 111, the second communication target, and the second single-mode optical fiber 112, and to transmit the laser beams of the third communication target, the third single-mode optical fiber 113, the fourth communication target, and the fourth single-mode optical fiber 114; the second dichroic mirror 93 is configured to transmit the laser beams of the first communication target and the first single-mode optical fiber 111 and to reflect the laser beams of the second communication target and the second single-mode optical fiber 112; the third dichroic mirror 92 is configured to reflect the laser beams of the third communication target and the third single-mode optical fiber 113 and to transmit the laser beams of the fourth communication target and the fourth single-mode optical fiber 114.

Based on the above lightweight scalable multi-user optical antenna, when the laser beams of the j communication targets are received:

1), the data analysis and instruction system 8 receives initial position information of a first communication target, analyses a positional relationship between an initial position of the communication target and an initial position of a first sub-liquid crystal in the coarse tracking liquid crystal 1, and provides an angle deflection information instruction for the coarse tracking liquid crystal controller 7.

2), the coarse tracking liquid crystal controller 7 coverts the angle deflection information instruction into a control voltage, inputs the control voltage to the first sub-liquid crystal of the coarse tracking liquid crystal 1 through a first voltage output end, and controls the deflection of the first sub-liquid crystal of the coarse tracking liquid crystal 1, thus enabling the first sub-liquid crystal of the coarse tracking liquid crystal 1 to point to the initial position of the first communication target.

3), the beam of the first communication target enters the field of view of the antenna, the beam of the first communication target is enabled to pass through the first sub-liquid crystal of the coarse tracking liquid crystal 1, the first region of the optical filter 2, the beam shrinking system 3, the first sub-liquid crystal of the fine tracking liquid crystal 4, the beam splitter 5 and the first coupling system 101 in sequence to generate a spot on a first region of the light-sensitive surface of the detector 102.

4), the data analysis and instruction system 8 extracts information of the spot output by the detector 102, performs analysis, and provides the angle deflection information instruction to the coarse tracking liquid crystal controller 7 according to the offset of the spot position relative to the center of the first region of the light-sensitive surface of the detector 102; the coarse tracking liquid crystal controller 7 converts the angle deflection information instruction into a control voltage, and controls the first sub-liquid crystal of the coarse tracking liquid crystal 1 to deflect.

5), steps 3a to 4a are repeated until the spot is located at the center of the first region of the light-sensitive surface of the detector 102 and has the strongest energy, because the above steps belong to coarse tracking, in this embodiment, it is only necessary to ensure that the allowable deviation between the spot position and the center of the first region of the light-sensitive surface of the detector 102 is ≤1 pixel.

6), the beam shrinking system 3 reduces the diameter of the beam transmitted by the first sub-liquid crystal of the coarse tracking liquid crystal 1 by N times and outputs a parallel beam to the surface of the first sub-liquid crystal of the fine tracking liquid crystal 4, and the parallel beam is enabled to pass through the beam splitter 5 and the first coupling system 101 in sequence to generate a spot on the first region of the light-sensitive surface of the detector 102.

7), the data analysis and instruction system 8 extracts spot information output by the first region of the light-sensitive surface of the detector 102, and provides the angle deflection information instruction for the fine tracking liquid crystal controller 6.

8), the fine tracking liquid crystal controller 6 converts the angle deflection information instruction into a control voltage, outputs the control voltage to the first sub-liquid crystal of the fine tracking liquid crystal 4 via the first voltage output end and controls the deflection of the first sub-liquid crystal of the fine tracking liquid crystal 4, thus enabling the first sub-liquid crystal of the fine tracking liquid crystal (4) to point to a specific position.

9), steps 6, 7 and 8 are repeated until the spot on the first region of the light-sensitive surface of the detector 102 is always stabilized at the center of the detector 102 without drift, the main function of fine tracking is to further restrain and correct the residual error of a coarse tracking loop, so as to meet the final alignment and tracking accuracy requirements of the optical antenna. Therefore, this embodiment needs to ensure that the deviation between the spot position and the center of the first region of the light-sensitive surface of the detector 102 is ≤⅕ pixel.

10), the dichroic coupling system 9 couples the laser beams of the first communication target into the first single-mode optical fiber 111.

11), step 1 to step 10 are repeated to successively realize the reception of the laser beams of j communication targets.

When the laser beam of the second communication target is received, the second communication object beam enters the field of view of the antenna, and the second communication object beam sequentially passes through the second sub-liquid crystal of the coarse tracking liquid crystal 1, the second region of the optical filter 2, the beam shrinking system 3, the second sub-liquid crystal of the fine tracking liquid crystal 4, the beam splitter 5, and the first coupling system 101, and a light spot appears at the second region of the light-sensitive surface of the detector 102. when the laser beam of the third communication target is received, the third communication object beam enters the field of view of the antenna, and the third communication object beam sequentially passes through the third sub-liquid crystal of the coarse tracking liquid crystal 1, the third region of the optical filter 2, the beam shrinking system 3, the third sub-liquid crystal of the fine tracking liquid crystal 4, the beam splitter 5, and the first coupling system 101 and a light spot appears at the third region of the light-sensitive surface of the detector 102. And so on, when the laser beam of the j-th communication target is received, the j-th communication target beam enters the field of view of the antenna, and the j-th communication target beam sequentially passes through the j-th sub-liquid crystal of the coarse tracking liquid crystal 1, the j-th region of the optical filter 2, the beam shrinking system 3, the j-th sub-liquid crystal of the fine tracking liquid crystal 4, the beam splitter 5, and the first coupling system 101, and then a light spot occurs at the j-th region of the light-sensitive surface of the detector 102.

In the present embodiment, the reception of the laser beams of four communication targets is sequentially implemented.

When the laser beam of the first communication target is achieved, the step 10 is specifically:

the first dichroic mirror 91 reflects the laser beam of the first communication target to the second dichroic mirror 93, the laser beam is transmitted through the second dichroic mirror 93 to reach the second coupling system 94, and is compressed through the second coupling system 94 to be coupled into the first single-mode optical fiber 111.

When the laser beam of the second communication target is achieved, the step 10 is specifically:

the first dichroic mirror 91 reflects the laser beam of the second communication target to the second dichroic mirror 93, the laser beam is reflected by the second dichroic mirror 93 to reach the third coupling system 96, and is compressed by the third coupling system 96 to be coupled into the second single-mode optical fiber 112.

When the laser beam of the third communication target is achieved, the step 10 is specifically:

the laser beam of the third communication target is transmitted by the first dichroic mirror 91 to the third dichroic mirror 92, the laser beam is reflected by the third dichroic mirror 92 to reach the fourth coupling system 901, and is compressed by the fourth coupling system 901 to be coupled into the third single-mode optical fiber 113.

When the laser beam of the fourth communication target is achieved, the step 10 is specifically:

the laser beam of the fourth communication target is transmitted by the first dichroic mirror 91 to the third dichroic mirror 92, is transmitted by the third dichroic mirror 92 to the fourth coupling system 901, and is compressed by the fourth coupling system 901 to be coupled into the fourth single-mode optical fiber 114.

It is finally achieved that the laser beams of the j users correspond one-to-one with the coarse tracking liquid crystal 1, the fine tracking liquid crystal 4, and the j regions of the detector 102 and are stably aimed at.

When the laser beams of the j communication targets are transmitted:

1), the data analysis and instruction system 8 acquires initial position information of the first communication target, and provides an angle deflection information instruction for the coarse tracking liquid crystal controller 7 according to a positional relationship between an initial position of the first communication target and an initial position of the coarse tracking liquid crystal 1.

2), the coarse tracking liquid crystal controller 7 converts the angle deflection information instruction into a control voltage, outputs the control voltage to the first sub-liquid crystal of the coarse tracking liquid crystal 1 through a first voltage output end, and controls the deflection of the first sub-liquid crystal of the coarse tracking liquid crystal 1, thus enabling the first sub-liquid crystal of the coarse tracking liquid crystal 1 to point to the initial position of the first communication target.

3), a beacon beam of the first communication target is enabled to pass through the first sub-liquid crystal of the coarse tracking liquid crystal 1, the first region of the optical filter 2, the beam shrinking system 3, the first sub-liquid crystal of the fine tracking liquid crystal 4, the beam splitter 5 and the first coupling system 101 in sequence to generate a spot on a first region of the light-sensitive surface of the detector 102.

4), the data analysis and instruction system 8 extracts information of the spot output by the detector 102, performs analysis, and provides the angle deflection information instruction to the coarse tracking liquid crystal controller 7 according to a positional relationship between the spot position and the center of the first region of the light-sensitive surface of the detector 102; the coarse tracking liquid crystal controller 7 converts the angle deflection information instruction into a control voltage, and controls the first sub-liquid crystal of the coarse tracking liquid crystal 1 to deflect.

5), steps 3b to 4b are repeated until the spot is located at the center of the first region of the light-sensitive surface of the detector 102 and has the strongest energy, in this embodiment, it is only necessary to ensure that the allowable deviation between the spot position and the center of the first region of the light-sensitive surface of the detector 102 is ≤1 pixel.

6), the beam shrinking system 3 reduces the diameter of the beam transmitted by the first sub-liquid crystal of the coarse tracking liquid crystal 1 and out puts a parallel beam to the surface of the first sub-liquid crystal of the fine tracking liquid crystal 4, and enables the parallel beam to pass through the beam splitter 5 and the first coupling system 101 in sequence to generate a spot on the first region of the light-sensitive surface of the detector 102.

7), the data analysis and instruction system 8 extracts spot information output by the first region of the light-sensitive surface of the detector 102, and provides the angle deflection information instruction for the fine tracking liquid crystal controller 6.

8), the fine tracking liquid crystal controller 6 converts the angle deflection information instruction into a control voltage, outputs the control voltage to the first sub-liquid crystal of the fine tracking liquid crystal 4 via the first voltage output end and controls the deflection of the first sub-liquid crystal of the fine tracking liquid crystal 4, thus enabling the first sub-liquid crystal of the fine tracking liquid crystal 4 to point to a specific position.

9), steps 6, 7 and 8 are repeated until the spot on the first region of the light-sensitive surface of the detector 102 is always stabilized at the center of the detector 102 without drift, in this embodiment, this step needs to ensure that the deviation between the spot position and the center of the first region of the light-sensitive surface of the detector 102 is ≤⅕ pixel.

10), the dichroic coupling system 9 converts an output beam of the single-mode optical fiber 111 into a space parallel beam, and then transmits the space parallel beam to the first sub-liquid crystal of the fine tracking liquid crystal 4 through the beam splitter 5.

11), the beam shrinking system 3 enlarges the diameter of the beam transmitted by the first sub-liquid crystal of the fine tracking liquid crystal 4; the beam is transmitted by the first region of the optical filter 2, is deflected to the direction of the first communication target via the first sub-liquid crystal of the coarse tracking liquid crystal 1 to establish a spatial laser link with the first communication target.

12), the processes of step 1 to step 11 are repeated to successively realize the transmission of the laser beams of j communication targets.

In the present embodiment, the transmission of laser beams of four communication targets is sequentially implemented; when the laser beam of the first communication target is transmitted, the step 10 is specifically:

the output beam of the first single-mode optical fiber 111 is converted into a spatially parallel beam through the second coupling system 94, the spatially parallel beam is transmitted through the second dichroic mirror 93 to reach the first dichroic mirror 91, is reflected through the first dichroic mirror 91 to the beam splitter 5, and is incident to the first sub-liquid crystal of the fine tracking liquid crystal 4 through the beam splitter 5.

When the laser beam of the second communication target is transmitted, the step 10 is specifically:

the output beam of the second single-mode optical fiber 112 is converted into a spatially parallel beam by the third coupling system 96, then the spatially parallel beam is reflected by the second dichroic mirror 93 to reach the first dichroic mirror 91, is reflected by the first dichroic mirror 91 to the beam splitter 5, and is incident to the second sub-liquid crystal of the fine tracking liquid crystal 4 via the beam splitter 5.

When the laser beam of the third communication target is transmitted, the step 10 is specifically:

the output beam of the third single-mode optical fiber 113 is converted into a spatially parallel beam by the fourth coupling system 901, the spatially parallel beam is then reflected by the third dichroic mirror 92 to reach the first dichroic mirror 91, is transmitted to the beam splitter 5 via the first dichroic mirror 91, and is incident to the third sub-liquid crystal of the fine tracking liquid crystal 4 via the beam splitter 5.

When the laser beam of the fourth communication target is transmitted, the step 10 is specifically:

the output beam of the fourth single-mode optical fiber 114 is converted into a spatially parallel beam through the fifth coupling system 99, the spatially parallel beam is transmitted through the third dichroic mirror 92 to reach the first dichroic mirror 91, is transmitted through the first dichroic mirror 91 to the beam splitter 5, and is incident to the fourth sub-liquid crystal of the fine tracking liquid crystal 4 through the beam splitter 5.

The above embodiments show that the lightweight scalable multi-user optical antenna proposed by the disclosure can realize simultaneous data transmission for multiple laser communication users by using multi-liquid crystal splicing and independent control, which has the advantage of simultaneous compatibility of multiple users, and has low resource requirements in terms of volume, weight, power consumption, etc. At the same time, the optical antenna proposed by the disclosure has strong scalability. When the number of users increases, only the sub-regions of the coarse tracking liquid crystal 1 and the fine tracking liquid crystal 4 need to be added, and no additional components need to be added, which solves the problem of resource constraints in terms of volume, weight, power consumption, etc. caused by the increase in the number of users, and reduces the engineering implementation cost.

What is claimed is:

1. A lightweight scalable multi-user optical antenna for simultaneous communication of j communication targets, wherein center wavelengths of laser beams of the j communication targets being different from each other with j being a natural number, comprising:
   a coarse tracking liquid crystal (1), an optical filter (2), a beam shrinking system (3), a fine tracking liquid crystal (4), and a beam splitter (5), which are arranged in sequence and are located on a same central axis, and
   a data analysis and instruction system (8), a coarse tracking liquid crystal controller (7), a fine tracking liquid crystal controller (6), j single-mode optical fibers, and an imaging system (100) and a dichroic coupling system (9) are respectively arranged in a first light path and a second light path of the beam splitter (5),
   wherein the beam splitter (5) is disposed at an angle of 135 degrees with the central axis; the coarse tracking liquid crystal (1) and the fine tracking liquid crystal (4) are each spliced by j sub-liquid crystals;
   the coarse tracking liquid crystal controller (7) and the fine tracking liquid crystal controller (6) each comprises j voltage output ends;
   each voltage output end of the coarse tracking liquid crystal controller (7) is connected with a sub-liquid crystal of the coarse tracking liquid crystal (1);
   each voltage output end of the fine tracking liquid crystal controller (6) is connected with a sub-liquid crystal of the fine tracking liquid crystal (4);
   the optical filter (2) has a surface divided into j regions, each region is coated with an antireflective film such that an i-th region allows transmission of only a laser beam of an i-th communication target having a center wavelength of $\lambda_i$, i being a natural number less than or equal to j;
   the imaging system (100) comprises a first coupling system (101) and a detector (102) arranged in sequence along the first light path, a light-sensitive surface of the detector (102) being divided into j regions;
   the laser beams of the j communication targets are in one-to-one correspondence with the j sub-liquid crystals of the coarse tracking liquid crystal (1), the j regions of the optical filter (2), the j sub-liquid crystals of the fine tracking liquid crystal (4), the j regions of the detector (102), and the j single-mode optical fibers;
   an input end of the data analysis and instruction system (8) is connected with the detector (102), and an output end is respectively connected with the coarse tracking liquid crystal controller (7) and the fine tracking liquid crystal controller (6).

2. The lightweight scalable multi-user optical antenna according to claim 1, wherein
   the dichroic coupling system (9) comprises j−1 dichroic mirrors and j coupling systems, the j−1 dichroic mirrors are configured to selectively transmit or reflect laser beams of a set center wavelength and discriminate laser beams of the j communication targets by different center wavelengths; the j coupling systems couple the laser beams of different center wavelengths into the corresponding single-mode optical fibers after beam compression, convert output beams of the single-mode optical fibers into parallel beams and input the parallel beams to corresponding dichroic mirrors.

3. The lightweight scalable multi-user optical antenna according to claim 1, wherein the beam shrinking system (3) consists of a Maksutov telescopic objective and a refractive eyepiece, and a lens and a reflector in the Maksutov telescopic objective are both spherical mirrors.

4. The lightweight scalable multi-user optical antenna according to claim 3, wherein the fine tracking liquid crystal (4) forms a rectangular liquid crystal device after stacking of three layers of dual-state dual-frequency liquid crystal devices;
   each layer of the dual-state dual-frequency liquid crystal device in the fine tracking liquid crystal (4) comprises a first liquid crystal region and a second liquid crystal region from left to right in sequence; control voltages of the first liquid crystal region and the second liquid crystal region are different;
   a ratio of the first liquid crystal region to the second liquid crystal region in the first layer of the dual-state dual-frequency liquid crystal device is 3:1;
   a ratio of the first liquid crystal region to the second liquid crystal region in the second layer of the dual-state dual-frequency liquid crystal device is 2:2; and
   a ratio of the first liquid crystal region to the second liquid crystal region in the third layer of the dual-state dual-frequency liquid crystal device is 1:3.

5. The lightweight scalable multi-user optical antenna according to claim 3, wherein
   a beam shrinking proportion of the beam shrinking system (3) is N; and
   an area of the coarse tracking liquid crystal (1) is N times an area of the fine tracking liquid crystal (4), wherein N is a natural number.

6. The lightweight scalable multi-user optical antenna according to claim 5, wherein each of the j coupling systems comprises a system vacuum compensation lens, and four transmissive optical lenses.

7. The lightweight scalable multi-user optical antenna according to claim 1, wherein the detector (102) is a CMOS infrared image sensor.

8. The lightweight scalable multi-user optical antenna according to claim 7, wherein j=4;
   the dichroic coupling system (9) comprises a first dichroic mirror (91), a second dichroic mirror (93), a third dichroic mirror (92), a second coupling system (94), a third coupling system (96), a fourth coupling system (901) and a fifth coupling system (99);
   the first dichroic mirror (91), the third dichroic mirror (92), the fifth coupling system (99) and a fourth single-mode optical fiber (114) are arranged in sequence and located on a same horizontal central axis as the beam splitter (5);
   the first dichroic mirror (91) is placed at an angle of 135° to the horizontal central axis;
   the third dichroic mirror (92) is placed at an angle of 45° to the horizontal central axis;
   the first dichroic mirror (91), the second dichroic mirror (93), the second coupling system (94) and a first single-mode optical fiber (111) are arranged in sequence and on a same vertical central axis;
   the second dichroic mirror (93), the third coupling system (96) and a second single-mode optical fiber (112) are arranged in sequence and on the same horizontal central axis;

the second dichroic mirror (93) is placed at an angle of 135° to the horizontal central axis;

the third dichroic mirror (92), the fourth coupling system (901) and a third single-mode optical fiber (113) are arranged in sequence and on the same vertical central axis;

the first dichroic mirror (91) is configured to reflect laser beams of a first communication target, the first single-mode optical fiber (111), a second communication target and the second single-mode optical fiber (112) and to transmit laser beams of a third communication target, the third single-mode optical fiber (113), a fourth communication target and the fourth single-mode optical fiber (114);

the second dichroic mirror (93) is configured to transmit the laser beams of the first communication target and the first single-mode optical fiber (111) and to reflect the laser beams of the second communication target and the second single-mode optical fiber (112); and the third dichroic mirror (92) is configured to reflect the laser beams of the third communication target and the third single-mode optical fiber (113) and to transmit the laser beams of the fourth communication target and the fourth single-mode optical fiber (114).

9. A method for implementing multi-user communication based on the lightweight scalable multi-user optical antenna according to claim 1, comprising the steps of:

when the laser beams of the j communication targets are received:

Step 1a, receiving, by the data analysis and instruction system (8), initial position information of a first communication target, and providing an angle deflection information instruction for the coarse tracking liquid crystal controller (7) according to a positional relationship between an initial position of the first communication target and an initial position of a first sub-liquid crystal in the coarse tracking liquid crystal (1);

Step 2a, converting, by the coarse tracking liquid crystal controller (7), the angle deflection information instruction into a control voltage, inputting the control voltage to the first sub-liquid crystal of the coarse tracking liquid crystal (1) through a first voltage output end, and controlling the deflection of the first sub-liquid crystal of the coarse tracking liquid crystal (1), thus enabling the first sub-liquid crystal of the coarse tracking liquid crystal (1) to point to the initial position of the first communication target;

Step 3a, enabling the beam of the first communication target to pass through the first sub-liquid crystal of the coarse tracking liquid crystal (1), the first region of the optical filter (2), the beam shrinking system (3), the first sub-liquid crystal of the fine tracking liquid crystal (4), the beam splitter (5) and the first coupling system (101) in sequence to generate a spot on a first region of the light-sensitive surface of the detector (102);

Step 4a, extracting, by the data analysis and instruction system (8), information of the spot output by the detector (102), performing analysis, and providing the angle deflection information instruction to the coarse tracking liquid crystal controller (7) according to a positional relationship between the spot position and the center of the first region of the light-sensitive surface of the detector (102); converting, by the coarse tracking liquid crystal controller (7), the angle deflection information instruction into a control voltage, and controlling the first sub-liquid crystal of the coarse tracking liquid crystal (1) to deflect;

Step 5a, repeating steps 3a to 4a until the spot is located at the center of the first region of the light-sensitive surface of the detector (102) and has the strongest energy, wherein the allowable deviation is less than or equal to a pixel, a pixel is the smallest imaging unit of the detector (102), and the energy is the strongest; wherein a is a positive number;

Step 6a, reducing, by the beam shrinking system (3), the diameter of the beam transmitted by the first sub-liquid crystal of the coarse tracking liquid crystal (1) and outputting a parallel beam to the surface of the first sub-liquid crystal of the fine tracking liquid crystal (4), and enabling the parallel beam to pass through the beam splitter (5) and the first coupling system (101) in sequence to generate a spot on the first region of the light-sensitive surface of the detector (102);

Step 7a, extracting, by the data analysis and instruction system (8), spot information output by the first region of the light-sensitive surface of the detector (102), and providing the angle deflection information instruction for the fine tracking liquid crystal controller (6);

Step 8a, converting, by the fine tracking liquid crystal controller (6), the angle deflection information instruction into a control voltage, outputting the control voltage to the first sub-liquid crystal of the fine tracking liquid crystal (4) via the first voltage output end and controlling the deflection of the first sub-liquid crystal of the fine tracking liquid crystal (4), thus enabling the first sub-liquid crystal of the fine tracking liquid crystal (4) to point to a specific position;

Step 9a, repeating steps 6a, 7a and 8a until the spot on the first region of the light-sensitive surface of the detector (102) is always stabilized at the center of the detector (102) without drift, wherein the allowable deviation is smaller than or equal to b pixels, and a pixel is the smallest imaging unit of the detector (102), wherein b is a positive number smaller than a;

Step 10a, coupling, by the dichroic coupling system (9), the laser beams of the first communication target into the first single-mode optical fiber (111); and Step 11a, repeating the processes of step 1a to step 10a to successively realize the reception of the laser beams of j communication targets;

when the laser beams of the j communication targets are transmitted:

Step 1b, acquiring, by the data analysis and instruction system (8), initial position information of the first communication target, and providing an angle deflection information instruction for the coarse tracking liquid crystal controller (7) according to a positional relationship between an initial position of the first communication target and an initial position of the coarse tracking liquid crystal (1);

Step 2b, converting, by the coarse tracking liquid crystal controller (7), the angle deflection information instruction into a control voltage, outputting the control voltage to the first sub-liquid crystal of the coarse tracking liquid crystal (1) through a first voltage output end, and controlling the deflection of the first sub-liquid crystal of the coarse tracking liquid crystal (1), thus enabling the first sub-liquid crystal of the coarse tracking liquid crystal (1) to point to the initial position of the first communication target;

Step 3b, enabling a beacon beam of the first communication target to pass through the first sub-liquid crystal of the coarse tracking liquid crystal (1), the first region of the optical filter (2), the beam shrinking system (3), the first sub-liquid crystal of the fine tracking liquid crystal (4), the beam splitter (5) and the first coupling system (101) in sequence to generate a spot on a first region of the light-sensitive surface of the detector (102);

Step 4b, extracting, by the data analysis and instruction system (8), information of the spot output by the detector (102), performing analysis, and providing the angle deflection information instruction to the coarse tracking liquid crystal controller (7) according to a positional relationship between the spot position and the center of the first region of the light-sensitive surface of the detector (102); converting, by the coarse tracking liquid crystal controller (7), the angle deflection information instruction into a control voltage, and controlling the first sub-liquid crystal of the coarse tracking liquid crystal (1) to deflect;

Step 5b, repeating steps 3b to 4b until the spot is located at the center of the first region of the light-sensitive surface of the detector (102) and has the strongest energy, wherein the allowable deviation is less than or equal to a pixels, a pixel is the smallest imaging unit of the detector (102), and the energy is the strongest; wherein a is a positive number;

Step 6b, reducing, by the beam shrinking system (3), the diameter of the beam transmitted by the first sub-liquid crystal of the coarse tracking liquid crystal (1) and outputting a parallel beam to the surface of the first sub-liquid crystal of the fine tracking liquid crystal (4), and enabling the parallel beam to pass through the beam splitter (5) and the first coupling system (101) in sequence to generate a spot on the first region of the light-sensitive surface of the detector (102);

Step 7b, extracting, by the data analysis and instruction system (8), spot information output by the first region of the light-sensitive surface of the detector (102), and providing the angle deflection information instruction for the fine tracking liquid crystal controller (6);

Step 8b, converting, by the fine tracking liquid crystal controller (6), the angle deflection information instruction into a control voltage, outputting the control voltage to the first sub-liquid crystal of the fine tracking liquid crystal (4) via the first voltage output end and controlling the deflection of the first sub-liquid crystal of the fine tracking liquid crystal (4), thus enabling the first sub-liquid crystal of the fine tracking liquid crystal (4) to point to a specific position;

Step 9b, repeating steps 6b, 7b and 8b until the spot on the first region of the light-sensitive surface of the detector (102) is always stabilized at the center of the detector (102) without drift, wherein the allowable deviation is smaller than or equal to b pixels, and a pixel is the smallest imaging unit of the detector (102), wherein b is a positive number smaller than a;

Step 10b, converting, by the dichroic coupling system (9), an output beam of the single-mode optical fiber (111) into a space parallel beam, and then transmitting the space parallel beam to the first sub-liquid crystal of the fine tracking liquid crystal (4) through the beam splitter (5);

Step 11b, enlarging, by the beam shrinking system (3), the diameter of the beam transmitted by the first sub-liquid crystal of the fine tracking liquid crystal (4); transmitting the beam by the first region of the optical filter (2), deflecting the beam to the direction of the first communication target via the first sub-liquid crystal of the coarse tracking liquid crystal (1), and establishes a spatial laser link with the first communication target; and Step 12b, repeating the processes of step 1b to step 11b to successively realize the transmission of the laser beams of j communication targets.

10. The method for implementing multi-user communication according to claim 9, wherein in Step 10a:

the first dichroic mirror (91) reflects the laser beam of the first communication target to the second dichroic mirror (93), the laser beam is transmitted through the second dichroic mirror (93) to reach the second coupling system (94), and is compressed through the second coupling system (94) to be coupled into the first single-mode optical fiber (111); and in Step 10b:

the output beam of the first single-mode optical fiber (111) is converted into a spatially parallel beam through the second coupling system (94), the spatially parallel beam is transmitted through the second dichroic mirror (93) to reach the first dichroic mirror (91), is reflected through the first dichroic mirror (91) to the beam splitter (5), and is incident to the first sub-liquid crystal of the fine tracking liquid crystal (4) through the beam splitter (5).

11. The method for implementing multi-user communication according to claim 9, wherein:

when reception of the laser beam of the second communication target is implemented, in Step 10a:

the first dichroic mirror (91) reflects the laser beam of the second communication target to the second dichroic mirror (93), the laser beam is reflected by the second dichroic mirror (93) to reach the third coupling system (96), and is compressed by the third coupling system (96) to be coupled into the second single-mode optical fiber (112);

in Step 10b:

the output beam of the second single-mode optical fiber (112) is converted into a spatially parallel beam by the third coupling system (96), then the spatially parallel beam is reflected by the second dichroic mirror (93) to reach the first dichroic mirror (91), is reflected by the first dichroic mirror (91) to the beam splitter (5), and is incident to the second sub-liquid crystal of the fine tracking liquid crystal (4) via the beam splitter (5);

when reception of the laser beam of the third communication target is implemented, in Step 10a:

the laser beam of the third communication target is transmitted by the first dichroic mirror (91) to the third dichroic mirror (92), is reflected by the third dichroic mirror (92) to the fourth coupling system (901), is compressed by the fourth coupling system (901) to be coupled into the third single-mode optical fiber (113);

in Step 10b:

the output beam of the third single-mode optical fiber (113) is converted into a spatially parallel beam by the fourth coupling system (901), the spatially parallel beam is then reflected by the third dichroic mirror (92) to reach the first dichroic mirror (91), is transmitted to the beam splitter (5) via the first dichroic mirror (91), and is incident to the third sub-liquid crystal of the fine tracking liquid crystal (4) via the beam splitter (5); and when reception of the laser beam of the fourth communication target is implemented, in Step 10a:

the first dichroic mirror (91) transmits the laser beam of the third communication target to the third dichroic mirror (92), the laser beam is transmitted through the third dichroic mirror (92) to the fifth coupling system (99), and is compressed through the fifth coupling system (99) to be coupled into the fourth single-mode optical fiber (114); and in Step 10b:

the output beam of the fourth single-mode optical fiber (114) is converted into a spatially parallel beam through the fifth coupling system (99), the spatially parallel beam is transmitted through the third dichroic mirror (92) to reach the first dichroic mirror (91), is transmitted through the first dichroic mirror (91) to the beam splitter (5), and is incident to the fourth sub-liquid crystal of the fine tracking liquid crystal (4) through the beam splitter (5).

12. The method for implementing multi-user communication according to claim 11, wherein $b \leq 1/5$.

\* \* \* \* \*